United States Patent

Kanamaru et al.

[11] 4,392,296
[45] Jul. 12, 1983

[54] METHOD OF JOINING TWO METAL MEMBERS

[75] Inventors: Hisanobu Kanamaru; Akira Tohkairin, both of Katsuta; Hideo Tatsumi, Mito; Naotatsu Asahi, Katsuta; Mitsuo Haginoya, Ibaraki, all of Japan

[73] Assignee: Hitachi, Ltd., Tokyo, Japan

[21] Appl. No.: 193,442

[22] Filed: Oct. 3, 1980

[30] Foreign Application Priority Data

Oct. 5, 1979 [JP] Japan .................................. 54-129290

[51] Int. Cl.³ ...................... B21D 39/00; B23P 11/00
[52] U.S. Cl. .................................. 29/520; 29/522 A; 192/84 A; 403/278
[58] Field of Search ...................... 29/520, 522 A, 521; 192/84 C, 84 A; 403/274, 285, 278; 72/402

[56] References Cited

U.S. PATENT DOCUMENTS

| | | | |
|---|---|---|---|
| 2,517,598 | 8/1950 | Rehnberg et al. | 72/402 |
| 2,804,679 | 9/1957 | Tracy | 29/522 R X |
| 3,559,946 | 2/1971 | Baxter, Jr. | 29/521 |
| 4,249,298 | 2/1981 | Kanamaru et al. | 29/520 |
| 4,305,198 | 12/1981 | Kanamaru et al. | 29/522 X |

FOREIGN PATENT DOCUMENTS 576322   5/1958   Italy ...................................... 29/520

Primary Examiner—Charlie T. Moon
Attorney, Agent, or Firm—Antonelli, Terry & Wands

[57] ABSTRACT

In a method of joining two metal members by forming an annular groove at least on one of the two metal members to be joined and causing part of the material of the metal member to flow into the annular groove by plastic deformation to form a joint, at least one annular angled member is formed in the annular groove. The annular angled member extending the entire periphery of the annular groove is substantially triangular in axial cross-sectional shape. The joint has increased strength and can be formed with reduced pressure.

15 Claims, 14 Drawing Figures

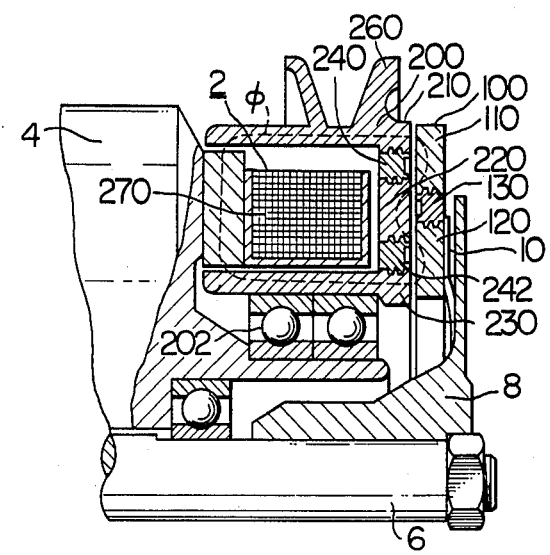
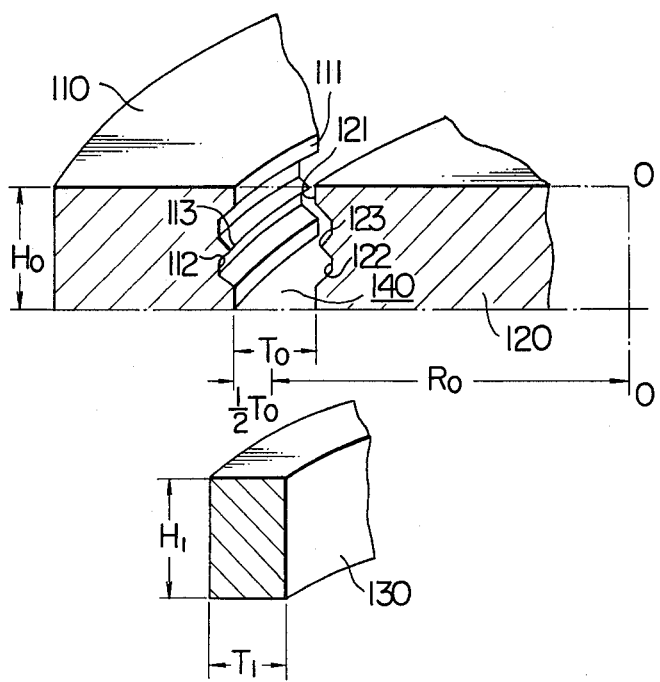

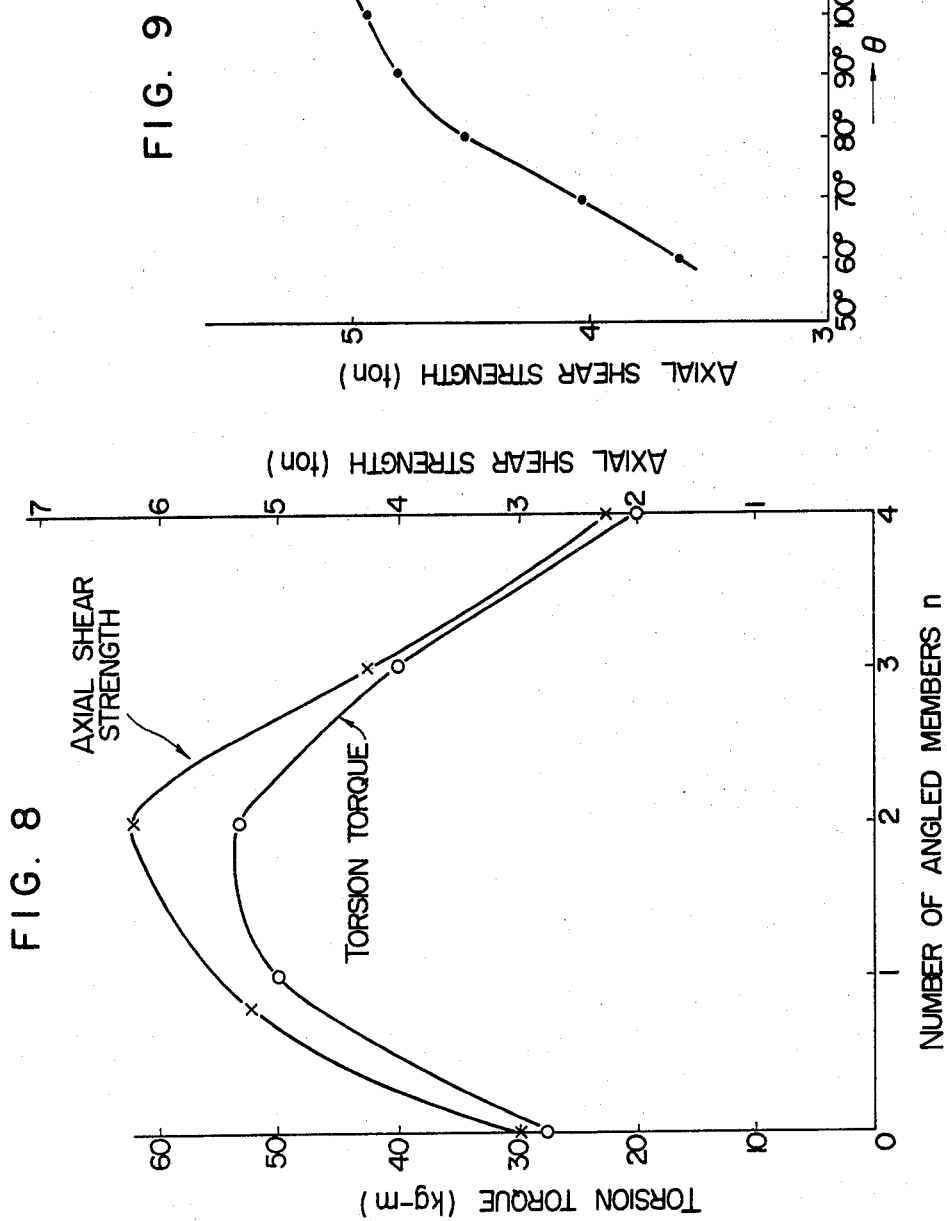

METHOD OF JOINING TWO METAL MEMBERS

BACKGROUND OF THE INVENTION

This invention relates to methods of joining two metal members by utilizing plastic deformation, and more particularly it is concerned with a joining method suitable for use in rigidly securing metal members, such as shafts, cylinders, disks, etc., to each other.

In one method of joining two metal members to each other known in the art, an annular groove is formed on each of the metal members and a metal ring is force fitted between the two metal members to cause part of the metal ring to undergo plastic deformation and flow into the grooves in the metal members. The art described is disclosed in U.S. Pat. No. 3,559,946 and U.S. Pat. No. 2,804,679, for example.

This joining method has the advantage of imparting higher shear strength to the joint than a method of joining two metal members together merely by force fitting. However, the methods disclosed in the documents referred to hereinabove have been carried into practice for joining stationary members to each other, and no attempts have ever been made to apply the art to joining of metal members transmitting a torque. When the metal members transmit a torque, the joint provided by joining them should have higher shear strength or torsional strength than the joint formed by joining members that do not transmit a torque. The results of experiments conducted by us show that it is impossible to obtain sufficiently high strength with which the two metal members are joined to each other merely by increasing the dimensions of the grooves or increasing the depth and width of the grooves or by increasing the number of grooves. These measures are intended to increase the volume of metallic material flowing into the grooves. However, when these measures are adopted, no satisfactory results could be achieved because the distance of movement of the metallic material increases and this would cause an increase in frictional loss occurring when a metallic material flows. Thus even if higher pressure is applied, it would be impossible to obtain satisfactory inflow of the metallic material into the grooves, and voids would be present in the grooves. As a result, the strength with which the two metal members are joined would not increase and a potential source of corrosion would be formed. An increase in the pressure with which joining is effected would cause those parts of the metal members which do not concern in joining to undergo plastic deformation, thereby making dimensional accuracy of the product unobtainable.

SUMMARY OF THE INVENTION

This invention has as its object the provision of a method of joining two metal members of the type wherein joining is effected by causing metallic material to flow by plastic deformation into at least one groove formed in a position in which joining is to be effected, which enables a joint of high strength to be obtained by applying low pressure to effect joining.

The outstanding characteristic of the invention is that at least one annular angled member is formed in a groove to reduce the volume of the metallic material to be filled in the groove, to thereby increase the area of contact in the joint and increase the strength with which the two metal members are joined.

The invention can have application in joining two metal members by using a connecting ring or directly without using a connecting ring.

BRIEF DESCRIPTION OF THE DRAWINGS

FIG. 1 is a vertical sectional view of the essential portions of an electromagnetic clutch in which the invention is incorporated;

FIGS. 2–6 show one embodiment of the invention of joining the discal plates shown in FIG. 1, FIG. 2 showing them prior to joining, FIG. 3 showing the connecting ring being inserted between the first and second discal plates, FIG. 4 showing the manner in which pressure is applied by using a mold, and FIG. 5 showing the two discal plates after joined;

FIGS. 6 and 7 are vertical sectional views of the discal plate showing the shape and configuration of the groove in detail;

FIGS. 8–11 are diagrams showing the relation between the configuration of the groove and the strength of the joint;

DESCRIPTION OF THE PREFERRED EMBODIMENTS

Figure 3:
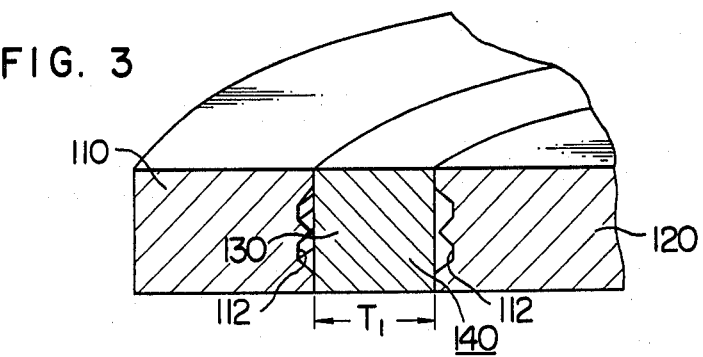

An embodiment of the invention in which a connecting ring is used for effecting joining will be described with regard to an electromagnetic clutch in which the invention is incorporated.

FIG. 1 shows in a vertical sectional view the essential portions of an electromagnetic clutch 2 used for connecting a compressor 4 to an engine, not shown. The compressor 4 carries a shaft 6 having secured thereto a hub 8 to which a discal plate 100 is connected through a spring 10. The discal plate 100 is juxtaposed against a rotor 200.

The discal plate 100 includes a first discal plate 110 formed of magnetic material or sheet steel, a second discal plate 120 also formed of magnetic material and a connecting ring 130 formed of non-magnetic material such as cooper for mechanically connecting the two discal plates 110 and 120 together.

The rotor 200 is journalled by a bearing 202 secured to the compressor 4 and includes a first rotor plate 210, a second rotor plate 220 and a third rotor plate 230 (all formed of sheet steel) which are mechanically connected together by a first connecting ring 240 and a second connecting ring 242 formed of copper. The first rotor plate 210 is formed on its outer periphery with a V-pulley 260. The numeral 270 designates an electromagnetic coil in which a magnetic flux $\phi$ is produced along a path indicated by a broken line.

The method of forming the discal plate 100 will now be described. This method can have application in the production of the rotor 200.

Referring to FIG. 2, the first discal plate 110 and the second discal plate 120 are fabricated by blanking sheet steel and include joining surfaces 111 and 121 respectively which are spaced apart by an annular gap 140 of a width $T_0$ and a height $H_0$. The joining surfaces 111 and 121 are formed with a plurality of annular grooves 112 and 122 respectively which extend through the entire periphery of the discal plates 110 and 120. The grooves 112 and 122 may be formed by using a forming tool having a cutting edge concomitant in shape with the cross-sectional shape of the grooves.

Annular angled members 113 and 123 are formed in the grooves 112 and 122 respectively. These angled members may be formed not only by simultaneously with forming the groove but also by rolling the bottom of a shallow groove. Detailed description of the shape and configuration of the grooves is subsequently to be made.

Meanwhile the connecting ring 130 is formed of non-magnetic material, such as copper, which more readily undergoes plastic deformation than the first and second discal plates 110 and 120, and has a width $T_1$ substantially equal to the width $T_o$ of the gap 140 and a height $H_1$ substantially equal to the height $H_o$ of the gap 140. However, when the height $H_o$ of the gap 140 is large, the height $H_1$ of the connecting ring 130 may be reduced below the height $H_o$ so long as required strength can be given to the joint.

The collecting ring 130 may be formed by cutting a copper pipe or by pressing and bending a copper sheet or copper wire. Copper powder may be sintered to provide the connecting ring 130.

The process of joining the first discal plate 110 to the second discal plate 120 by using the connecting ring 130 will now be described.

First of all, the connecting ring 130 is inserted in the gap 140 between the two discal plates 110 and 120 as shown in FIG. 3.

Figure 4:
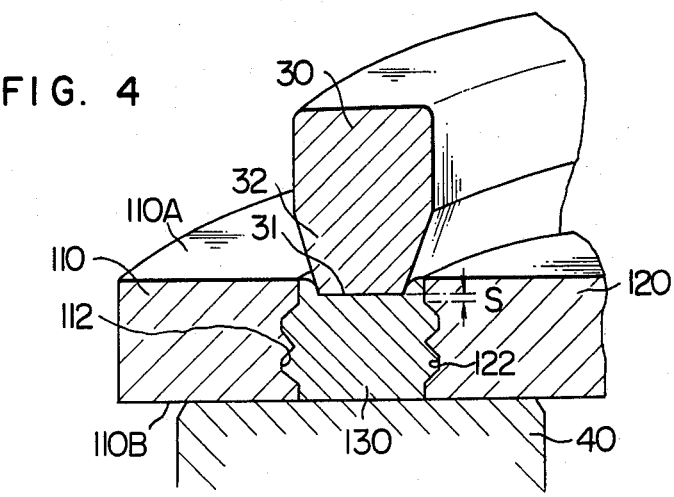

Then, as shown in FIG. 4, the two discal plates 110 and 120 having the connecting ring 130 inserted in the gap 140 therebetween are placed on a lower mold member 40, and a load is applied to the connecting ring 130 by means of an upper mold member 30 in such a manner that the material of the connecting ring 130 such as copper undergoes plastic deformation and part of the material flows into the grooves 112 and 122. The steps shown in FIGS. 3 and 4 are carried out in cold working.

Figure 5:
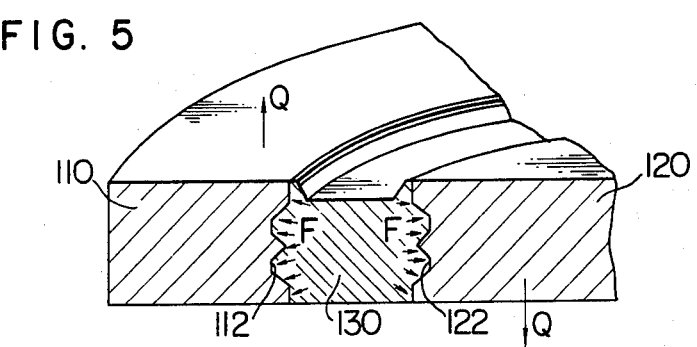

FIG. 5 shows the two discal plates 110 and 120 after joined together. By inserting the connecting ring 130 in the gap 140 between the first and second discal plates 110 and 120, a force F urging the gap between the two discal plates to expand acts on the connecting ring 130, so that the two discal plates 110 and 120 are restrained in a constant positional relation radially thereof. Also, inflow of part of the connecting ring 130 into the grooves 112 and 122 gives rise to a shearing force Q oriented in the direction of axes of the two discal plates 110 and 120.

Thus the first and second discal plates 110 and 120 constitute the unitary discal plate 100 with the first and second discal plates 110 and 120 being mechanically connected to each other through the connecting ring 130 but magnetically separated from each other by the ring 130.

Figure 6:
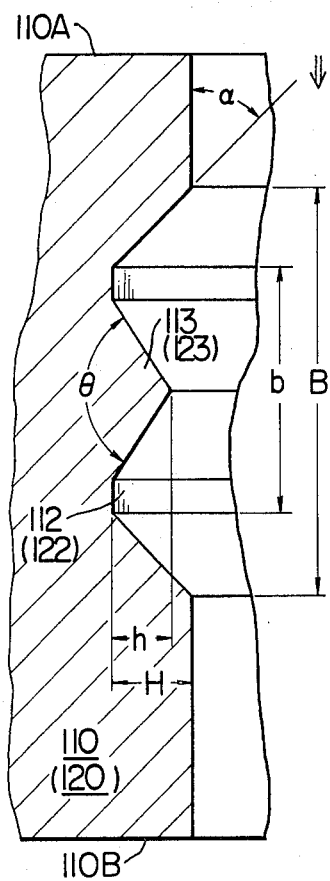

The shape and configuration of the grooves will be described in detail. FIG. 6 is a vertical sectional view, on an enlarged scale, of the discal plate showing one example of the grooves. The connecting ring 130 flows into the grooves in the direction of an arrow. An angled member 113 is formed in each of the grooves 112 and 122 of the discal plates 110 and 120 respectively. The angled members 113 formed in the grooves 112 and 122 are of the same shape and configuration, so that the angled member 113 formed in the groove 112 will be described. The angled member 113 is triangular in cross-sectional shape and extends along the entire circumferential extent of the groove 112.

Figure 7:
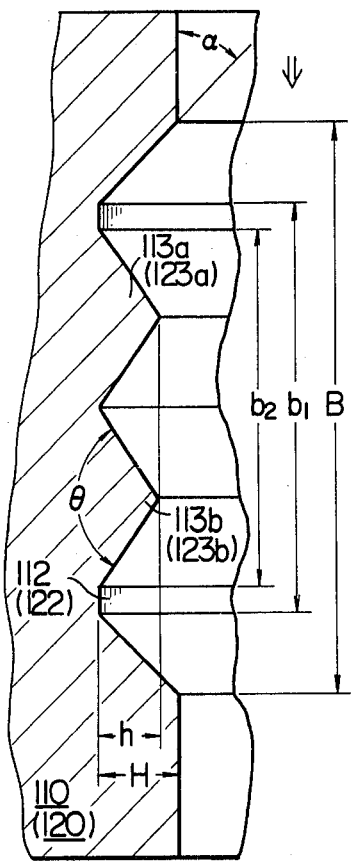

As shown in FIG. 7, two angled members 113a and 113b may be formed in the groove 112. The cross-sectional shape of the groove 112 is determined by the depth H of the groove, the width B of the groove (at the inlet end), the angle of inclination α of the side wall of the groove on which the side pressure is applied, the number n of the angled members and the height h of the angled members. The practical ranges of values of these factors will be described.

The depth H of the groove is preferably in the range between 0.1 and 1.0 mm, more preferably in the range between 0.2 and 0.6 mm. When the depth is too small, the side surface of the groove would readily undergo plastic deformation as an external force is exerted thereon in an axial direction, thereby making it impossible to give sufficiently high shear strength to the joint. When the depth is too large, enough inflow of the material into the groove would be unobtainable and voids would be present in the groove, thereby reducing the strength of the joint. The presence of the voids would cause corrosion of the material.

The width B of the groove may be varied depending on the required shear strength of the joint formed. When the width B is too great, the distance between the forward end of the upper mold member and the lower end of the groove becomes too great, so that the flow frictional loss of the material (connecting ring) flowing into the groove would increase. As a result, even if a large load is applied by means of the upper mold member, the internal stresses of the material near the lower end of the groove could not be increased to a level sufficiently high to allow plastic deformation to take place. Thus the amount of the material (connecting ring) undergoing plastic deformation would be reduced and an inflow of the material in an enough amount into the groove would be unobtainable. For the same reason, the groove 112 should be positioned such that it is disposed as near as possible to an upper side surface 110A of the discal plate 110 between the upper side surface 110A and a lower side surface 110B, or to the side at which the connecting ring 130 is introduced into the gap 140 and hence to the groove 112.

The angle of inclination α of the side wall of the groove near the upper side surface 110A of the discal plate 110 or near the upper mold member 30 in FIG. 4 at which pressure is applied exerts great influences on the inflow of the material of the connecting ring 130 into the groove 112. With the angle of inclination α having a higher value than is necessary, a larger number of voids of larger areas would be produced in groove 112 and the strength of the joint formed would be reduced.

With the angle of inclination α having a smaller value than is necessary, inflow of the material of the connecting ring 130 into the groove 112 could be facilitated but the force with which the side walls of the groove 112 and the connecting ring 130 are joined together would be reduced, thereby causing a reduction in the axial shear strength of the joint.

The results of experiments conducted by us show that the angle of inclination α is preferably in the range between 20 and 70 degrees, or more preferably in the range between 30 and 60 degrees.

FIG. 8 is a diagram showing the relation between the number of the angled members to the strength of the joint, obtained as the results of experiments. In the experiments, the first and second discal plates of steel and the connecting ring of copper were used, and the groove had a depth of 0.4 mm. The width of the groove was also constant.

It will be seen that the torque strength (kg-m) and the axial shear strength (ton) were maximized when the number n of the angled members was two (2). The results of experiments show that the number n of the angled members is preferably in the range between 1 and 3.

With the angled member or members in the groove, the area of contact in the groove between the first and second discal plates 110 and 120 and the connecting ring 130 is increased as compared with the corresponding area of contact obtained when the bottom of the groove is flat, but the volume of the connecting ring 130 filled in the groove 112 is reduced. Therefore, with the load applied to the connecting ring 130 being constant, the provision of the angled member or members facilitates inflow of the material of the connecting ring 120 into the groove 112 and increases the degree with which the connecting ring 130 is brought into intimate contact with the first and second discal plates 110 and 120, thereby increasing the strength of the joint.

As described hereinabove, the width B of the groove should be in a certain range of values to make the method practicable. When the number n of the angled members is increased with the width B in this range, the vertical angle $\theta$ of the angled member subsequently to be described becomes small, so that satisfactory inflow of the material of the connecting ring into the groove would become unobtainable. The material would flow in such a manner that inflow of the material into the groove would become poorer in going away from the side of the groove near the upper mold member 30 at which pressure is applied, and voids would be formed between the angled members in positions remote from the pressure applying side. Such voids would remain after joining of the first and second discal plates 110 and 120 is achieved.

FIG. 9 is a diagram showing the relation between the vertical angle $\theta$ and the strength of the joint (axial shear strength), with the depth of the groove H=0.4 mm, the height of the angled member h=0.3 mm and the number of the angled member n=1. It will be seen that the strength was maximized when the vertical angle was about $\theta$=110 degrees, and that the value is preferably in the range between 80 and 130 degrees for practical purposes.

Figure 10:
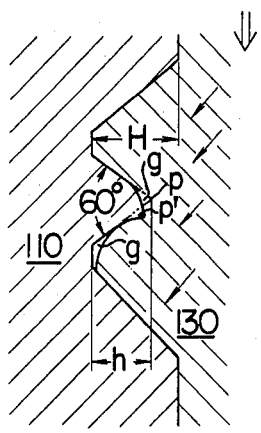

When the vertical angle was small or $\theta$=60 degrees, the apex P of the angled member was deformed (as indicated at P') in the direction of arrows or in a direction in which pressure is applied to the connecting ring 130, as shown in FIG. 10. Thus a gap g was formed at the back of the apex and a similar gap g was formed near the bottom of the groove rearwardly of the angled member, thereby reducing the strength of the joint.

The height h of the angled member has a desirable range of values. When the height h was too large, flow resistance of the material increased as the material flow into the groove, particularly into the back of the angled member. Conversely, when the height h was too small, the provision of the angled member had no effect and the strength of the joint was not increased. As described hereinabove, the groove has a depth H which would be in a certain range of values for practical purposes. The range of values of the height h of the angled member or members that can be used for practical purposes may be determined in relation to the value of the depth H of the groove.

Figure 11:
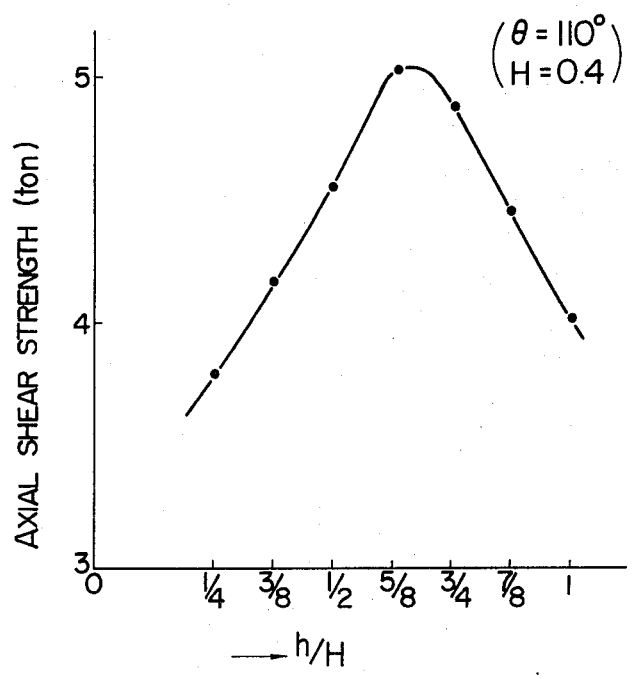

FIG. 11 shows in a diagram the strength of the joint (shear strength against an axially applied external force) in relation to the ratio of the height h of the angled member or members to the depth H of the groove or h/H. The angled member was one in number, with the vertical angle being $\theta$=110 degrees and the depth being H=0.4 mm.

It will be seen in the figure that the height h of the angled member is preferably in the range between $\frac{3}{8}$ H and 1 H, or more preferably in the range between $\frac{1}{2}$ H and $\frac{7}{8}$ H.

Examples of the shape and configuration of the groove as a whole which is preferable because it is determined based on the aforesaid factors concerned in determining the cross-sectional shape and configuration of the groove will be described. With one angled member as shown in FIG. 6, such groove would have the following values: the width B of the groove B=2.0 mm; the depth H of the groove H=0.4 mm; the angle of inclination $\alpha$ of the side wall of the groove on the pressure applying side $\alpha$=45 degrees; the height h of the angled member h=0.3 mm; the vertical angle $\theta$ of the angled member $\theta$=110 degrees; and the width b of the bottom of the groove b=1.2 mm. With two angled members as shown in FIG. 7, such groove would have the following values: B=2.8 mm; H=0.4 mm; h=0.3 mm; $\alpha$=45 degrees; $\theta$=110 degrees; $b_1$=2.0 mm; and $b_2$=1.8 mm.

Figure 12:
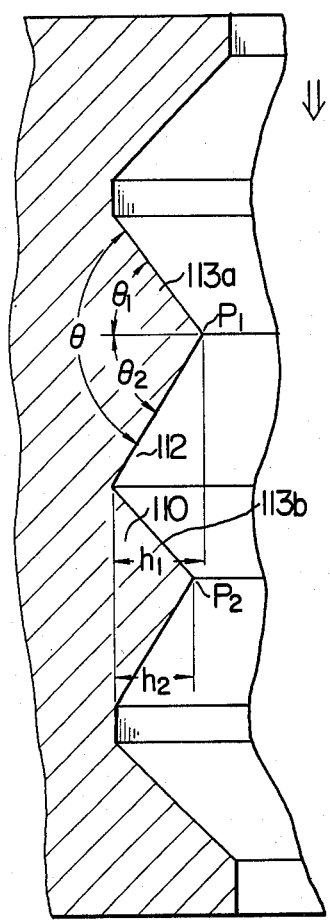
FIG. 12 shows a modification of the groove according to the invention.

It is not essential that the angled member be in the form of an equilateral triangle or an isoscles triangle in cross-sectional form as shown in the embodiments of FIGS. 6 and 7. By taking into consideration the flow of the material, the vertical angle $\theta_1$ near the side at which the pressure is applied or the side near the upper mold member (the side is reversed when pressure is applied by the lower mold member) may be made slightly larger than the vertical angle $\theta_2$ remote therefrom, as shown in FIG. 12.

From the same point of view, when a plurality of angles are formed in a groove, the height $h_1$ of the angled member near the side at which pressure is applied may have a larger value than the height $h_2$ of the angled member remote therefrom.

The angled member is not limited to a triangular shape in cross section and may be similar to a triangle in cross-sectional shape. For example, the angled member may have a substantially triangular shape which diverges near the bottom side or a trapezoidal shape having a relatively short upper side. With the angled member having the aforesaid cross-sectional shapes, all the factors concerned in the determination of the shape and configuration of the groove should have values which are in the aforesaid ranges for practical purposes. It is to be understood that the practical value ranges of these factors are valid even if the connecting ring and the first and second discal plates are formed of materials different from the materials described hereinabove.

In the case of an electromagnetic clutch described hereinabove, the positions of the grooves formed on the surfaces of the first and second discal plates to be joined are determined without trouble because the discal plates have a relatively small thickness. However, when metal members to be joined have a large thickness, a groove is preferably formed, as described hereinabove, in a position which is as near as possible to the upper side of the metallic members to be joined. When pressure is applied by an upper mold member to the material, a loss of the material due to the flow frictional resistance of the material would increase if the spacing between the forward end of the upper mold member and the groove is large. As a result, the material near the groove would have high internal stress and satisfactory inflow of the material into the groove could not be obtained. The depth to which the forward end of the upper mold member is inserted may vary depending on the width $T_o$ of the gap 140 between the two discal plates 110 and 120. For practical purposes, the position of the groove is preferably determined in such a manner that $S=0$ to $\frac{1}{4} T_o$, where $T_o$ is the width of the annular gap 140 and S is the spacing between the forward end of the upper mold member and the upper end of the groove as shown in FIG. 4.

To increase torsional strength of the joint, the annular angled member may be knurled on its entire periphery or formed with a multiplicity of grooves disposed equidistantly normal to the axis of the angled member.

Figure 13:
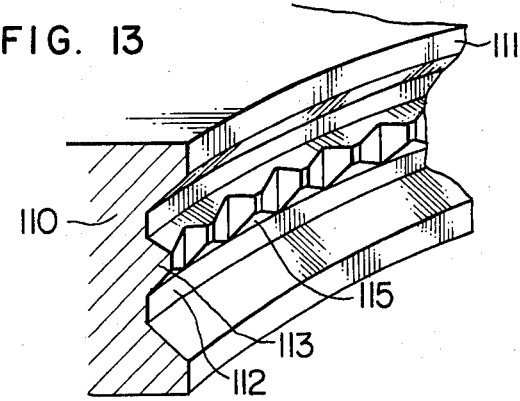
FIG. 13 is a perspective view of the discal plate showing a further modification of the groove according to the invention.

FIG. 13 shows angled members in the groove 112 being knurled at 115, with the angled members being substantially pyramidic in shape and arranged continuously in the groove 112. The knurled portions 115 may have a height of 0.1–0.5 mm depending on the height of the angled member 113. The provision of the knurled members would increase torsional strength of the joint fourfold to fivefold.

The invention can have application in joining two metal members together without using a connecting ring. The practical values of the factors concerned in the determination of the shape and configuration of the groove should also have ranges of values similar to those described by referring to the eletromagnetic clutch hereinabove.

Figure 14:
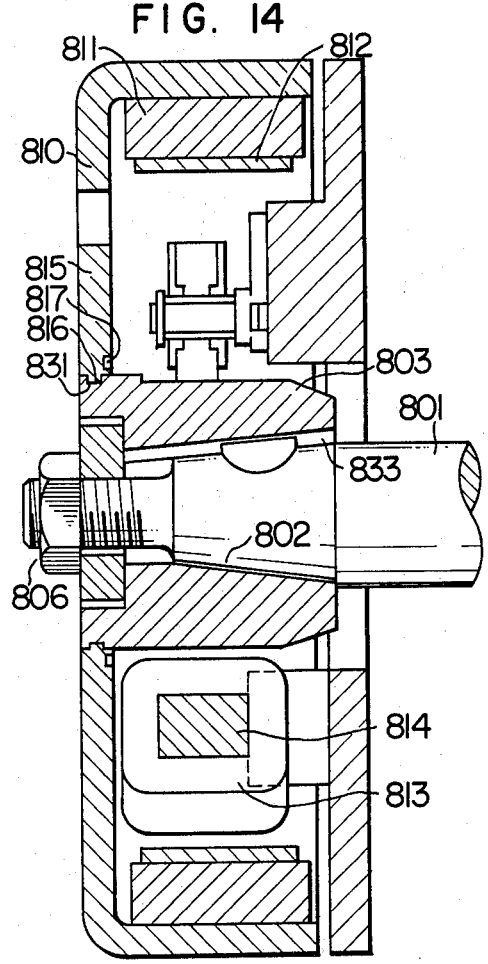
FIG. 14 is a vertical sectional view of the essential portions of the flywheel magnet produced by applying the present invention.

FIG. 14 shows a flywheel in which two metal members are directly joined to each other according to the invention, wherein a drive shaft 801 for an engine is tapered at one end thereof as shown at 802.

A hub 803 formed of carbon steel suitable for general machinery application is secured to the drive shaft 801 by means of a key 833 and a nut 806. Permanent magnets 811 and magnetic pole pieces 812 are alternately arranged in a cup-shaped flywheel yoke 810 and disposed along the circumference of an imaginary circle centered at the drive shaft 801. The magnetic pole pieces 812 are disposed at their inner surfaces in spaced juxtaposed relation to fixed iron cores 814 each having a generating coil 813 would thereon. The flywheel yoke 810 is formed by forming soft sheet steel into a cup shape.

The hub 803 is formed on its outer periphery with an annular groove 831 in which angled members and knurled portions similar to those shown in FIG. 13 are formed.

In joining the flywheel yoke 810 to the hub 803, an inner end surface 816 of a discal portion 815 of the flywheel yoke 810 serving as a joining surface is positioned against the groove 831 in the hub 803, and pressure is applied to a portion 817 of the flywheel yoke 810 near the joining surface of the yoke 810 by a mold member while the hub 803 and the flywheel yoke 810 are being restrained by another mold member. In this way, part of the material of the flywheel yoke 810 is caused to flow into the groove 831 to thereby join the flywheel yoke 810 to the hub 803.

The aforesaid connection of the flywheel yoke to the hub offers the advantages that the strength of the joint is increased and the axial length of the joint can be reduced as compared with a connection obtained by riveting.

From the foregoing description, it will be appreciated that according to the invention at least one angled member is formed in a groove formed on each of joining surfaces of two metal members to be joined. By virtue of this feature, the area of contact between the two metal members at the joint increases and the volume of the material flowing into the groove decreases as compared with joining of two metal members having no angled member. Thus the invention enables a joint of higher strength to be obtained by applying lower pressure than hitherto, and the joint produced is high in quality and reliable in performance.

What is claimed is:

1. A method of joining two metal members, each having a joining surface arranged in such a manner that the joining surfaces of the two metal members are in spaced juxtaposed relation, by way of a third metal member comprising the steps of:

forming an annular groove on each of said joining surfaces of said two metal members;

inserting a metal ring, of which said third member is comprised, in a gap defined between the joining surfaces of said two metal members; and applying pressure to said connecting ring to cause part of the material thereof to flow into said annular groove, to form a joint; wherein the improvement comprises the steps of:

forming in each of said annular groove, simultaneously with or after forming said annular groove, at least one annular angled member having a height h that is substantially smaller than the depth H of said annular groove in accordance with the relationship $\frac{1}{4}H \leq h \leq (\frac{1}{2})H$ and being substantially triangular in shape in axial cross section.

2. A method of joining two metal members as claimed in claim 1, wherein said at least one annular angled member formed in said annular groove is 1–3 in number.

3. A method of joining two metal members as claimed in claim 1, wherein said at least one annular angled member has a vertical angle in the range between 80 and 130 degrees.

4. A method of joining two metal members as claimed in claim 1, wherein said at least one annular angled member is formed with irregularities continuous peripherally thereof.

5. A method of joining two metal members as claimed in claim 4, wherein said irregularities continuous peripherally of said at least one annular angled member are formed by knurling.

6. A method of joining two metal members, each having a joining surface, one of said metal members having a higher deformation resistance than the other, comprising the steps of:

forming an annular groove on the joining surface of the one of said two metal members having higher deformation resistance; arranging the two metal members in such a manner that the joining surfaces of the two metal members are in juxtaposed relation; and applying pressure to the other metal member of lower deformation resistance to cause part of the material thereof to flow into said groove to form a joint;

wherein the improvement comprises the step of:

forming in said annular groove, simultaneously with or after forming said annular groove, at least one annular angled member having a height h that is substantially smaller than the depth H of said annular groove in accordance with the relationship $\frac{1}{8}H \leq h \leq (\frac{7}{8})H$ and being substantially triangular in shape in axial cross section.

7. A method of joining two metal members as claimed in claim 6 wherein said at least one annular angled member formed in said annular groove is 1–3 in number.

8. A method of joining metal members as claimed in claim 6 wherein said annular angled member has a vertical angle in the range between 80 and 130 degrees.

9. A method of joining two metal members as claimed in claim 6, wherein said at least one annular angled member is formed with irregularities continuous peripherally thereof.

10. A method of joining two metal members as claimed in claim 9, wherein said irregularities continuous peripherally of said at least one annular angled member are formed by knurling.

11. A method of joining two metal members as claimed in claim 6, wherein the metal member of lower deformation resistance is a metal ring, said metal ring being disposed in an annular gap defined between the joining surface of the member of higher deformation resistance and a third metal member, said third member having a higher deformation resistance than that of said metal ring.

12. A method of joining two metal members as claimed in claim 6, wherein said member of lower deformation resistance is only locally deformed for direct coupling together of only said two metal members.

13. A method according to claim 1 or 6, wherein the step of forming an annular groove is performed so as to produce a groove of depth H of 0.1–1.0 mm.

14. A method according to claim 1 or 6, wherein the step of forming an annular groove is performed so as to produce a groove of depth H of 0.2–0.6 mm.

15. A method according to claim 14, wherein said annular angled member is formed with periphery having a multiplicity of grooves of 0.1–0.5 mm in dependence on the heigh h of the annular angled member.

* * * * *